(12) United States Patent
Pedro Santos Manso Côrte-Real et al.

(10) Patent No.: US 12,298,230 B2
(45) Date of Patent: May 13, 2025

(54) DETECTION METHOD

(71) Applicant: BIOSURFIT, S.A., Azambuja (PT)

(72) Inventors: José Pedro Santos Manso Côrte-Real, Lisbon (PT); José Miguel Silva Do Carmo Nogueira, Barreiro (PT); André Miguel Alves Farinha, Seixal (PT); Alberto Eduardo Artilheiro Ferreira, Lisbon (PT); Tiago Filipe Pinto Silva, Lisbon (PT); Mauro Miguel Melo Ribeiro, Apelação (PT); Filipe Da Conceição Fernandes Thomaz, Lisbon (PT); João Manuel De Oliveira Garcia Da Fonseca, Azambuja (PT)

(73) Assignee: BIOSURFIT, S.A., Azambuja (PT)

( * ) Notice: Subject to any disclaimer, the term of this patent is extended or adjusted under 35 U.S.C. 154(b) by 370 days.

(21) Appl. No.: 16/644,770

(22) PCT Filed: Sep. 4, 2018

(86) PCT No.: PCT/EP2018/073744
§ 371 (c)(1),
(2) Date: Mar. 5, 2020

(87) PCT Pub. No.: WO2019/048429
PCT Pub. Date: Mar. 14, 2019

(65) Prior Publication Data
US 2021/0063303 A1    Mar. 4, 2021

(30) Foreign Application Priority Data

Sep. 5, 2017 (PT) ...................................... 110277 J
Sep. 19, 2017 (EP) ...................................... 17191770

(51) Int. Cl.
*G01N 21/27* (2006.01)
*G01N 21/03* (2006.01)
(Continued)

(52) U.S. Cl.
CPC .......... *G01N 21/272* (2013.01); *G01N 21/07* (2013.01); *G01N 21/75* (2013.01);
(Continued)

(58) Field of Classification Search
CPC ...... G01N 21/272; G01N 21/07; G01N 21/75; G01N 35/00623; G01N 35/025;
(Continued)

(56) References Cited

U.S. PATENT DOCUMENTS 4,540,549 A    9/1985 Manabe
5,449,621 A *  9/1995 Klein ................... G01N 15/042
                                                      356/426
(Continued)

FOREIGN PATENT DOCUMENTS

CN    102301239 A  * 12/2011   ........... G01N 35/025
EP    2207024 A2    7/2010
(Continued)

OTHER PUBLICATIONS

Translation of WO2016152305A1, Makino, Akihisa, Sep. 29, 2016 (Year: 2016).*
(Continued)

*Primary Examiner* — Samuel P Siefke
*Assistant Examiner* — Henry H Nguyen
(74) *Attorney, Agent, or Firm* — Patterson, Thuente P.A.

(57) ABSTRACT

A detection system including a detection device and an assay device. The detection device includes a space for receiving an assay device, a drive arrangement engaging the assay device to rotate the assay device, a light source arranged to direct light towards the assay device, and a diffuser arranged to diffuse light from the light source. The diffuser is arranged between the light source and the space. The detection device (Continued)

includes a light receiver arranged to receive light from the light source that has passed through the assay device.

15 Claims, 5 Drawing Sheets

(51) Int. Cl.
   *G01N 21/07* (2006.01)
   *G01N 21/75* (2006.01)
   *G01N 35/00* (2006.01)
   *G01N 35/02* (2006.01)
   *G01N 35/04* (2006.01)

(52) U.S. Cl.
   CPC ..... *G01N 35/00623* (2013.01); *G01N 35/025* (2013.01); *G01N 2021/0357* (2013.01); *G01N 2035/00841* (2013.01); *G01N 2035/00851* (2013.01); *G01N 2035/0444* (2013.01)

(58) Field of Classification Search
   CPC . G01N 2021/0357; G01N 2035/00841; G01N 2035/00851; G01N 2035/0444; G01N 21/13; G01N 21/77; G01N 21/0303
   See application file for complete search history.

(56) References Cited

U.S. PATENT DOCUMENTS

| | | | |
|---|---|---|---|
| 2003/0224457 A1* | 12/2003 | Hurt | G01N 33/80 702/19 |
| 2009/0021741 A1 | 1/2009 | Kim et al. | |
| 2010/0188103 A1 | 7/2010 | Takai | |
| 2011/0017905 A1 | 1/2011 | Yeo | |
| 2011/0194114 A1* | 8/2011 | Yeo | G01N 21/59 356/435 |
| 2012/0293796 A1 | 11/2012 | Ludowise | |

FOREIGN PATENT DOCUMENTS

| | | |
|---|---|---|
| WO | WO 97/21090 A1 | 6/1997 |
| WO | WO 98/38510 A2 | 9/1998 |
| WO | WO 2011/078713 A1 | 6/2011 |
| WO | WO 2016/088992 A1 | 6/2016 |
| WO | WO-2016152305 A1 * | 9/2016 ........... G01N 21/272 |

OTHER PUBLICATIONS

Translation of CN102301239A1, Ishizawa, Masato, Dec. 28, 2011 (Year: 2011).*
International Search Report and Written Opinion of the ISA for PCT/EP2018/073744 dated Feb. 6, 2019, 20 pages.
EP Search Report for EP 17191770.1, dated Apr. 19, 2018, 10 pages.
Partial EP Search Report for EP 1719177.01 dated Jan. 15, 2018, 12 pages.
PT Search Report for PT 110277 dated Mar. 8, 2018, 12 pages.
Schembri C T et al.: "Portable Simultaneous Multiple Analyte Whole-Blood Analyzer for Point-of-Care Testing", Clinical Chemistry, American Association for Clinical Chemistry, Washington, DC, vol. 38, No. 9, Sep. 1, 1992 (Sep. 1, 1992), pp. 1665-1670, XP000319980, ISSN: 0009-9147 p. 1666, right-hand column lines 36-37 p. 1667, right-hand column lines 27-30 p. 1668, right-hand column lines 9-15.

* cited by examiner

DETECTION METHOD

RELATED APPLICATIONS

The present application is a National Phase entry of PCT Application No. PCT/EP2018/073744, filed Sep. 4, 2018, which claims priority from PT Application No. 110277 J filed Sep. 5, 2017 and EP Application No. 17191770.1 filed Sep. 19, 2017, all of these disclosures being hereby incorporated by reference in their entirety.

FIELD

The disclosure relates to a light detection method. In particular, but not exclusively, the disclosure relates to a method for determining an effect on light of a liquid sample in a rotating assay device.

BACKGROUND

Modern assays are often provided in the form of a microfluidic device (or cartridge) for use with a reader. The device allows a sample to be introduced and may carry other liquids in storage arrangements such as blister packs so that they can also be introduced into the device, for example by pressing on the blister pack. The device is then inserted into a reader for processing the sample and obtaining a read out of the assay. The reader is arranged to rotate to drive liquid flow for processing in assay devices.

Optical detection systems are often used to read out assay devices, for example by measuring light absorption of the liquid being tested. Some detection systems for measuring light absorption of a liquid sample use Paired Emitter-Detector Diodes (PEDD) which generally used a light emitting diode (LED) for a light source and a separate LED for a light receiver. The light source directs light to a light-transmitting chamber in the assay device holding the liquid sample. The light receiver is arranged to receive light from the light source that has passed through the chamber. A signal from the light receiver indicative of the received light from the detection device is then processed to carry out the assays, for example the concentration of an analyte based on light absorption, or perform quality control or calibration.

WO2011/078713 discloses a system for detecting the presence of an analyte in a detection portion of a substrate and in particular, the detection of analyte in a lab-on-a-disc system using the surface plasmon resonance effect.

SUMMARY

In some aspects of the disclosure, a method of determining an effect of a liquid sample on light is provided. The method comprises rotating an assay device comprising one or more chambers for containing the liquid sample and directing light from a light source to the rotating assay device such that the light passes through the one or more chambers as each of the one or more chambers is in a respective predetermined configuration relative to the light source and a light receiver. Then light from the light source that has passed through the one or more chambers within the rotating assay device is received at the light receiver. A set of light intensity measurements for each complete rotation of the assay device is then determined, and measurements within each set that were obtained when the light passed through the one or more chambers are determined. Using the measurements that were obtained when the light passed through the one or more chambers, the effect of the liquid sample on the light from the light source is determined.

The effect on the light may be amount of light absorption, light scattering, light reflection or changes in the refractive index of the liquid. The method enables an effect of the liquid sample on light to be determined without stopping the rotation of the assay device. Specifically, light readings may be taken at a plurality of different rotational positions of the assay device, and for a plurality of complete rotations (i.e. having been rotated by 360 degrees) of the assay device, in less time than would be required if the assay device was stopped at each rotation position where a light reading was to be taken because additional time is required to start and stop the rotation of the device.

Additionally, the same light intensity signal from the light receiver can be used for both identification of the chambers in the assay device as well as determination of the effect of the liquid sample on light. This enables the complexity of a system carrying out the method to be reduced compared to a system comprising separate means for identifying the chambers and determining the effect.

Furthermore, using the method, the assay device does not need to be stopped in a precise rotational position, i.e. the predetermined configuration relative to the light source and a light receiver, because a plurality of readings can be taken as the chamber passes through the predetermined configuration during each complete rotation. This also reduces the time required to obtain readings. Reducing time to perform an assay is particularly advantageous, for example, in the healthcare sector, where hundreds of medical assays may be performed at a given hospital each day to assist in patient diagnosis.

Measurements within each set that were obtained when the light passed through the one or more chambers may be determined based on a change in light intensity. For example, the light intensity may increase from a baseline light intensity as rotational angle of the assay device increases, marking the start of a chamber. Then the light intensity may decrease back to the baseline as rotational angle of the assay device increases, marking the end of that chamber. The light intensity measurements between the start and the end of a respective chamber may be determined to relate to the same chamber.

For example, if the light receiver is an LED, the light intensity measurement may be based on the time taken for the light receiver to reach a predetermined voltage (referred to as the "discharge time"), where a shorter discharge time indicates a higher light intensity and a longer discharge time indicates a lower light intensity. If light reaching the light receiver is not sufficient to discharge the light receiver to the predetermined voltage within a predetermined time, for example, when the light source, the light receiver and one of the chambers are not in a predetermined configuration, the measurement is considered out of time ("time-out"). Chambers may be identified from the set of measurements by, for example, determining that a first measurement of discharge time lower than the "time-out" discharge time corresponds to the start of a chamber, and determining that the measurement before a plurality of consecutive "time-out" discharge time measurements corresponds to the end of the chamber.

Each of the one or more chambers may be associated with a first reflecting surface and a second reflecting surface. Directing light may comprise, for each chamber, reflecting light from the light source to the respective chamber using the respective first reflecting surface, and reflecting light from the respective chamber to the light receiver using the respective second reflecting surface. The assay device has a plane perpendicular to an axis about which the assay device is rotated. The first reflecting surface may be arranged to reflect light from the light source into a direction in the plane and the second reflecting surface may be arranged to reflect light from a direction in the plane to the light receiver.

The method may comprise, for each set of measurements, determining the number of chambers in the respective set of measurements, and comparing the number of chambers with an expected number of chambers. Then if the number of chambers in the respective set of measurements is not the expected number of chambers, the respective set of measurements are rejected. In some embodiments, if the number of chambers in the respective set of measurements is not the expected number of chambers, all sets of measurements are rejected.

The method may comprise determining the position of a reference device and, for each set of measurements, determining whether each of the one or more chambers are in an expected position relative to the reference device in the respective set of measurements and rejecting the respective set of measurements if the one or more chambers are not in the expected position relative to the reference device in the respective set of measurements. In some embodiments, if the one or more chambers are not in the expected position relative to the reference device in the respective set of measurements, all sets of measurements are rejected.

Determining the position of the reference device may comprise receiving the position. Alternatively, determining the position of the reference device may comprise directing light from the light source to the rotating assay device such that the light passes through the reference device as the reference device is in a predetermined configuration relative to the light source and the light receiver, receiving, at the light receiver, light from the light source that has passed through the reference device within the rotating assay device, and determining measurements within each set of measurements that were obtained when the light passed through the reference device.

The method may comprise, determining whether each of the one or more chambers are in the respective predetermined configuration relative to the light source and the light receiver at an expected time in each complete rotation of the assay device in each set of measurements. Then if the one or more chambers are not in the respective predetermined configuration relative to the light source and the light receiver at the expected time, all sets of measurements are rejected. The expected time may be relative to the time at which the reference device is in its predetermined configuration relative to the light source and the light receiver in each complete rotation.

As described above, light readings of each complete rotation can be used to determine whether any readings should be rejected. In turn, this improves the accuracy of the assay by removing spurious data.

The method may comprise, storing the sets of measurements that are not rejected.

Each set of measurements may consist of a different number of measurements to each other, for example if the light receiver is an LED and the light intensity measurement is based on the time taken for the light receiver to reach a predetermined voltage (as discussed above). The method may comprise determining the number of measurements in one of the sets of measurements, and then changing the speed of rotation of the assay device based on the determined number of measurements. The speed of rotation may be changed based on, for example, a comparison between the number of measurements and an expected number of measurements such that the speed of rotation is increased if the number of measurements is greater than the expected number, and the speed of rotation is decreased if the number of measurements is fewer than the expected number.

In another example, the number of measurements in two sets of measurements is determined (e.g. two consecutive sets) and the speed of rotation may be changed based on a comparison between the number of measurements in two of the sets. If the first of the two sets consists of a greater number of measurements than the second of the two sets, then the speed of rotation of the assay device is reduced. Conversely, if the first of the two sets consists of fewer measurements than the second of the two sets, the speed of rotation of the assay device may be increased.

The method may comprise determining the number of measurements that meet a light intensity condition (e.g. the number of measurements that exceed a threshold light intensity or having a discharge time lower than the time-out condition) in one of the sets of measurements, and then changing the light intensity condition for sets of measurements for subsequent complete rotations based on the determined number of measurements that met the light intensity condition. Changing the light intensity condition may be based on, for example, a comparison between the number of measurements that met the light intensity condition and an expected number of measurements. If the number of measurements is greater than the expected number, the light intensity condition is changed to decrease the number of measurements taken in subsequent complete rotations (e.g. by increasing the light intensity threshold or by decreasing the time-out discharge time). Conversely, if the number of measurements is fewer than the expected number the light intensity condition is changed to increase the number of measurements taken in subsequent complete rotations (e.g. by decreasing the light intensity threshold or by increasing the time-out discharge time).

In another example, the number of measurements that meet a light intensity condition in two sets of measurements is determined (e.g. two consecutive sets) and the light intensity condition may be changed based on a comparison between the number of measurements that met the light intensity condition in the two of the sets of measurements. If the first of the two sets consists of a greater number of measurements than the second of the two sets, the light intensity condition may be changed such that more measurements are taken in subsequent complete rotations, e.g. by decreasing the light intensity threshold or by increasing the time-out discharge time. Conversely, if the first of the two consists of fewer measurements than the second of the two sets, the light intensity condition may be changed such that fewer measurements are taken in subsequent complete rotations, e.g. by increasing the light intensity threshold or by decreasing the time-out discharge time.

By changing the speed of rotation of the assay device and/or changing the light intensity condition, the number of measurements in each set is used as a feedback mechanism to achieve substantially uniform sampling rates (i.e. substantially the same number of measurements in each set of measurements), for example, that account for the influence of the liquid sample on the detected light as a reaction in the liquid progresses.

Further aspects of the disclosure relate to a non-transitory computer readable medium having computer-executable instructions to cause a computer system to perform the method of measuring an effect of a liquid sample on light.

Further aspects of the disclosure relate to a detection system. The detection system comprises an assay device having one or more chambers for containing a liquid sample, and a drive arrangement engaging the assay device to rotate the assay device. One or more light sources are each arranged to emit light towards a corresponding one of the one or more chambers within the assay device. The detection system also comprises a light receiver corresponding to each of the one or more light sources, each light receiver arranged to receive light from its respective chamber within the assay device. The detection system also comprises one or more processors. The processors are adapted to cause the drive arrangement to rotate the assay device at least one complete rotation, cause the one or more light sources to emit light towards the rotating assay device, and receive signals from the light receiver(s). The processor(s) are also adapted to determine a set of light intensity measurements for each complete rotation of the assay device, determine measurements within each set that were obtained when the light passed through the one or more chambers, and determine, using the measurements that were obtained when the light passed through the one or more chambers, the effect of the liquid sample on the light from the light source.

For each chamber, the assay device may comprise a first surface arranged to reflect light from the light source to the chamber, and a second surface arranged to reflect light from the respective chamber to the light receiver.

The processor(s) may be adapted to, for each set of measurements, determine the number of chambers in the respective set of measurements and compare the number of chambers with an expected number of chambers. The processor(s) may be adapted to reject the respective set of measurements if the number of chambers in the respective set of measurements is not the expected number of chambers. In some embodiments, if the number of chambers in the respective set of measurements is not the expected number of chambers, all sets of measurements are rejected.

The processor(s) may be adapted to determine the position of a reference device and, for each set of measurements, determine whether each of the one or more chambers are in an expected position relative to the reference device in the respective set of measurements and reject the respective set of measurements if the one or more chambers are not in the expected position relative to the reference device in the respective set of measurements. In some embodiments, if the one or more chambers are not in the expected position relative to the reference device in the respective set of measurements, all sets of measurements are rejected.

The processor(s) may be adapted to determine whether each of the one or more chambers are in the respective predetermined configuration relative to the light source and the light receiver at an expected time in each complete rotation of the assay device in each set of measurements. The processor(s) may be adapted to reject all sets of measurements if the one or more chambers are not in the respective predetermined configuration relative to the light source and the light receiver at the expected time.

The system may comprise a memory, and the processor(s) may be adapted to store the sets of measurements that are not rejected in the memory.

The processor(s) may be adapted to determine the number of measurements in one of the sets of measurements, and change the speed of rotation of the assay device based on the determined number of measurements.

The processor(s) may be adapted to determine the number of measurements that meet a light intensity condition in one of the sets of measurements, and change the light intensity condition for sets of measurements for subsequent complete rotations based on the determined number of measurements that met the light intensity condition.

BRIEF DESCRIPTION OF THE FIGURES

Specific embodiments are now described by way of example with reference to the drawings, in which.

DETAILED DESCRIPTION

A method for determining an effect of a liquid sample on light, such as amount of light absorption, light scattering, light reflection or changes in the refractive index of the liquid, comprises rotating an assay device having a chamber for containing the liquid sample. Light from a light source is directed to the rotating assay device such that the light passes through the chamber as the chamber is in a predetermined configuration relative to the light source and a light receiver. Then light from the light source that has passed through the chamber is received at the light receiver.

Figure 1:
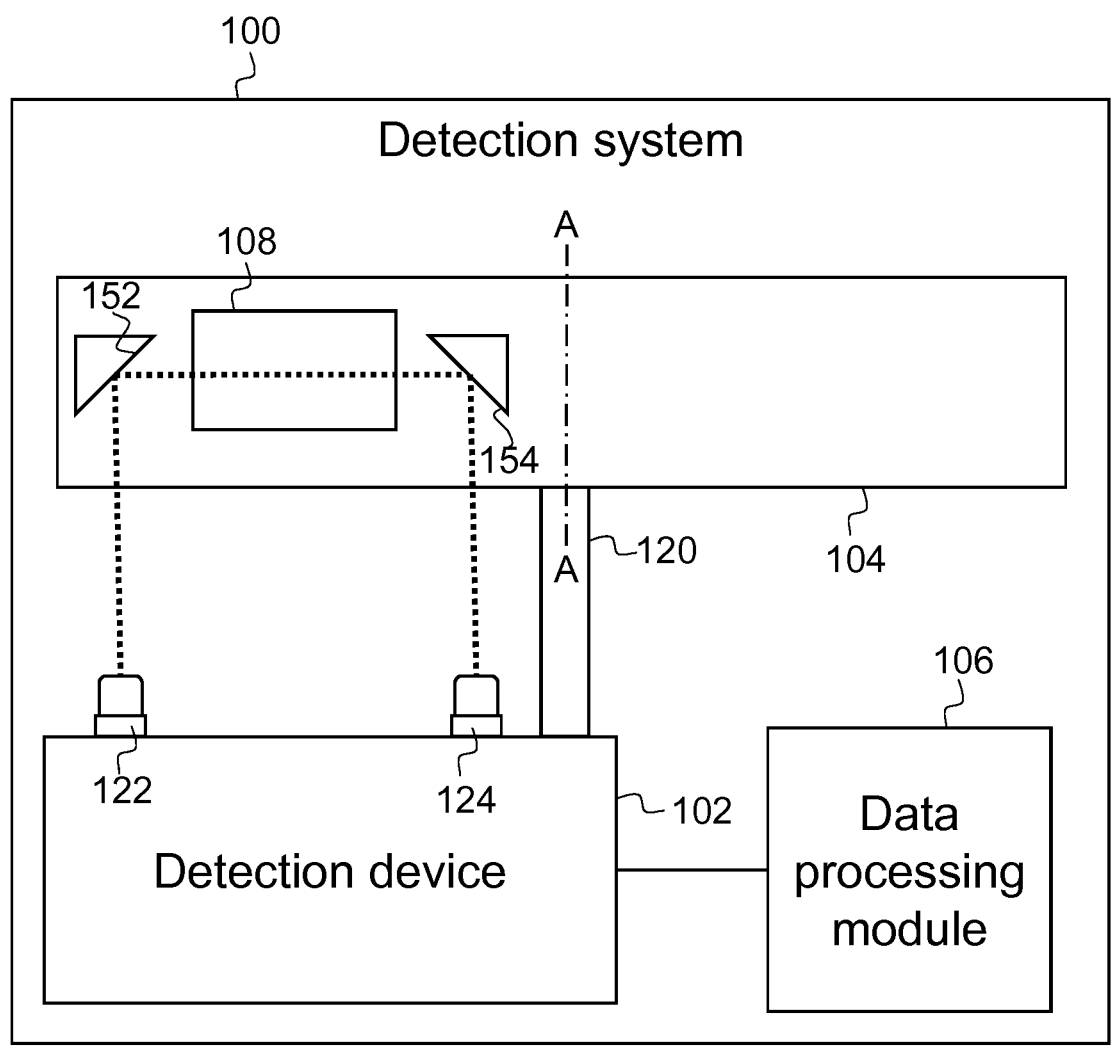
FIG. 1 illustrates a detection system.

With reference to FIG. 1, a detection system 100 comprises a detection device 102, an assay device 104 and a data processing module 106. The data processing module 106 is operatively connected to the detection device 102.

The detection device 102 is arranged to engage the assay device 104 for rotation using a spindle, as described below. The assay device 104 is removable from the detection system 100, and the detection system 100 comprises an opening through which the assay device 104 can be inserted into, and removed from, the detection system 100. For example, the detection system 100 may comprise a tray which is arranged to move into and out of the detection system, and onto which the assay device is placed, akin to a tray used to load a CD into a CD player. When an assay device has not been inserted into the detection system, the detection system comprises a space for receiving an assay device.

The assay device is disc-shaped and may be, for example, a lab-on-a-disc. The assay device, disc-shaped or otherwise, may comprise a central hole which is configured to engage with a spindle, the spindle being coupled to a motor for driving rotation of the spindle, which in turn drives rotation of the engaged device. The assay device 104 comprises a chamber 108 for containing a liquid to be tested, a first reflector 152 and a second reflector 154. The chamber 108 may be connected to an opening for receiving the liquid in the assay device via further chambers and/or conduits (not illustrated). The assay device 104 is arranged for rotation about an axis of rotation A-A to drive liquid flows in the assay device. For example, the assay device may be a microfluidic device in which the flow of liquid is driven by the rotation of the assay device.

The assay device comprises a plane perpendicular to the axis of rotation A-A. The chamber 108 may have a dimension up to 10 millimeters in the plane. The first reflector 152 is arranged to reflect light from the light source 122 substantially into the direction of the plane towards the chamber 108. The second reflector 154 is arranged to reflect light that has passed through the chamber 108 substantially in a direction parallel to the axis of rotation A-A towards the light receiver 124. The first and second reflectors 152, 154 are arranged such that light enters and leaves the assay device 104 on the same side of the assay device.

The first and second reflectors 152, 154 are configured to reflect light using total internal reflection. For example, the assay device 104 may have a plastic body in which the chamber 108 is provided, and the reflectors may provide a substantially 45 degree (relative to the incident light) boundary with air such that the difference in refractive index between the air and the plastic causes the incident light to be reflected. In other embodiments, the first and second reflectors 152, 154 may be mirrors or mirrored surfaces. For assay devices that are thin (in the direction of A-A relative to a dimension of the device in the plane), reflecting light through the chamber in the plane of the assay device enables light to travel through more of the liquid being tested compared to if the light was passed though the chamber in the direction of the axis A-A. In turn, this enables more light to be absorbed by the liquid being tested, leading to more refined and nuanced effects on the emitted light to be determined.

The detection system 100 is configured to rotate the assay device 104 according to a temporal profile of rotation speed to drive liquid flows in the device in accordance with the specific assay protocol implemented in the assay device. Occurrence of a reaction between the reagent and the analyte in the assay device alters the light received from the chamber, so that the light receiver signal can be used infer the presence or a characteristic (such as concentration) of the analyte in a liquid sample in the assay device. Whilst one chamber is described with reference to FIG. 1, it will be understood that an assay device may comprise a plurality of chambers for detection of the presence or a characteristic the analyte. Each chamber may be arranged to use the same light source and light receiver pair, or the detection device may comprise a light source and light receiver pair for each such detection chamber.

For the avoidance of doubt, the term "microfluidic" is referred to herein to mean devices having a fluidic element such as a reservoir or a channel with at least one dimension below 1 mm. The assay device may be configured to handle volumes of liquid on the scale of nanolitres to microliters or up to 100 microliters. Some but not necessarily all the structures on such an assay device may be microfluidic.

The detection device 102 comprises a spindle 120, a light source 122 and a light receiver 124. The light source 122 and light receiver 124 are arranged on the same side of the assay device 104. The detection device 102 supports the light source 122 and the light receiver 124 using a support structure, such as a frame.

The spindle 120 is configured to engage the assay device 104 to rotate the assay device about the axis of rotation A-A. A motor (not illustrated) is coupled to the spindle 120 to rotate the spindle. The light source 122 is arranged to emit light with a wavelength, for example, in the visible range such as orange or green, ultraviolet or infra-red light. The light receiver 124 is arranged to detect light in the range corresponding to the light emitted from the light source 122. In some embodiments, the light receiver 124 is arranged to detect light that is emitted as a result of fluorescence following absorption of light from the light source.

The light source 122 is arranged to emit light towards the assay device 104, such that as the assay device 104 is rotated, light passes through the chamber 108 when the chamber is in a predetermined configuration relative to the light source 122, the first reflector 152, the second reflector 154 and the light receiver 124. In other words, light emitted from the light source 122 is reflected towards the chamber 108, and light that has passed through the chamber 108 is reflected towards the light receiver 124.

In some embodiments, the detection device comprises a plurality of paired light sources and light receivers each for interacting with a corresponding chamber.

The data processing module 106 is arranged to control the detection device and may be arranged to receive data from the from the detection device to determine an effect of liquid in the chamber on emitted light. For example, the determined effect may be amount of light absorption, light scattering, light reflection or changes in the refractive index of the liquid. The data processing module 106 receives a signal indicative of the received light from the detection device, such as a voltage signal from the light receiver. The received signals are then processed by the data processing module to carry out the assays, for example the concentration of an analyte based on light absorption, or perform quality control or calibration.

The data processing module 106 is arranged to receive data from the detection device and determine an effect of liquid in the chamber on emitted light, as described in greater detail with reference to FIGS. 2 to 4. For example, the determined effect may be amount of light absorption, light scattering, light reflection or changes in the refractive index of the liquid.

It is to be understood that the first and second reflectors 152, 153 of the assay device 104 are optional. For example, the light source 122 and the light receiver 124 may be arranged on opposite sides of the assay device such that light passes through the chamber when the chamber is in a predetermined configuration relative to the light source and light receiver.

In some embodiments, the assay device comprises a third reflector arranged to reflect light from the light source to a fourth reflector, and the fourth reflector is arranged to reflect light to the light receiver. The light between the third and fourth reflectors may pass through an empty chamber or without passing through a chamber, i.e. light is transmitted through the body of the assay device. Both of these arrangements can be used to provide a reference signal for the paired light source and light receiver.

Figure 2:
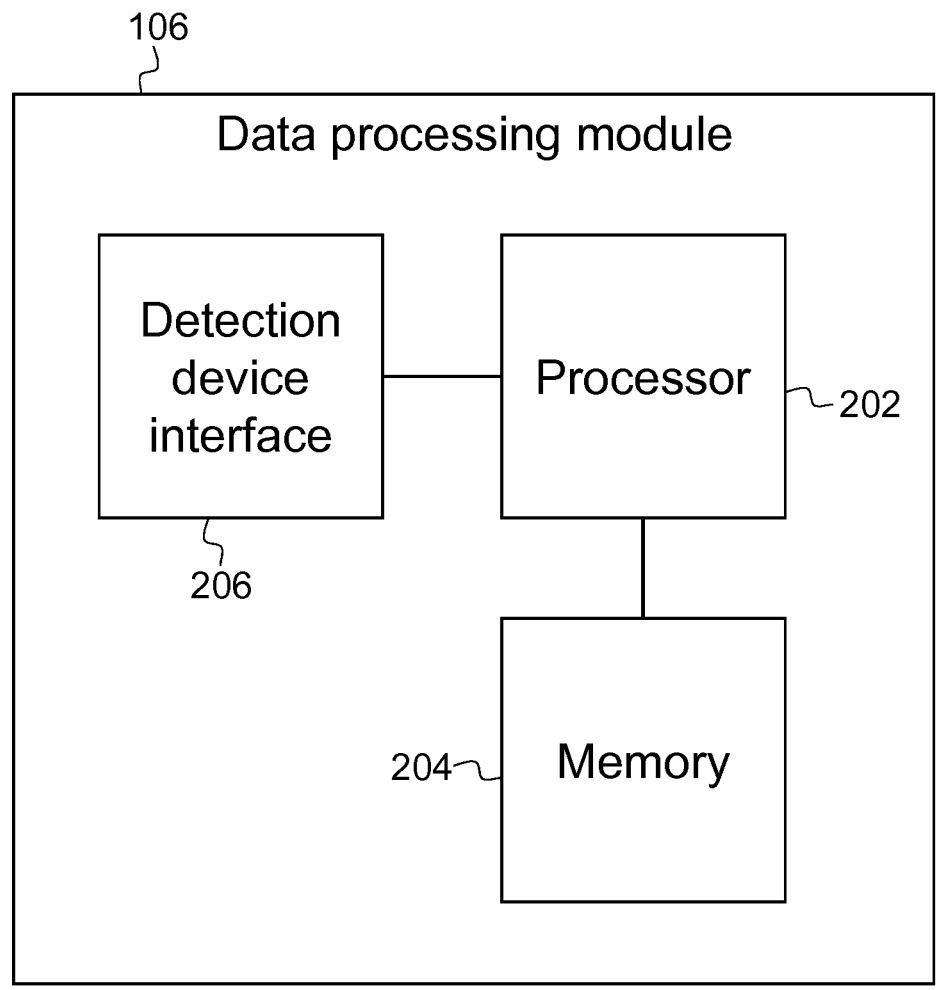
FIG. 2 illustrates a data processing module.

With reference to FIG. 2, the data processing module 106 comprises a processor 202, a memory 204 such as a non-volatile memory, and a detection device interface 206. The processor 202 is configured to coordinate between the memory 204 and the detection device interface 206. The detection device interface 206 is arranged to communicate with the detection device 102. The data processing module 202 is arranged to determine the light absorption by the assay device 104.

Figure 3:
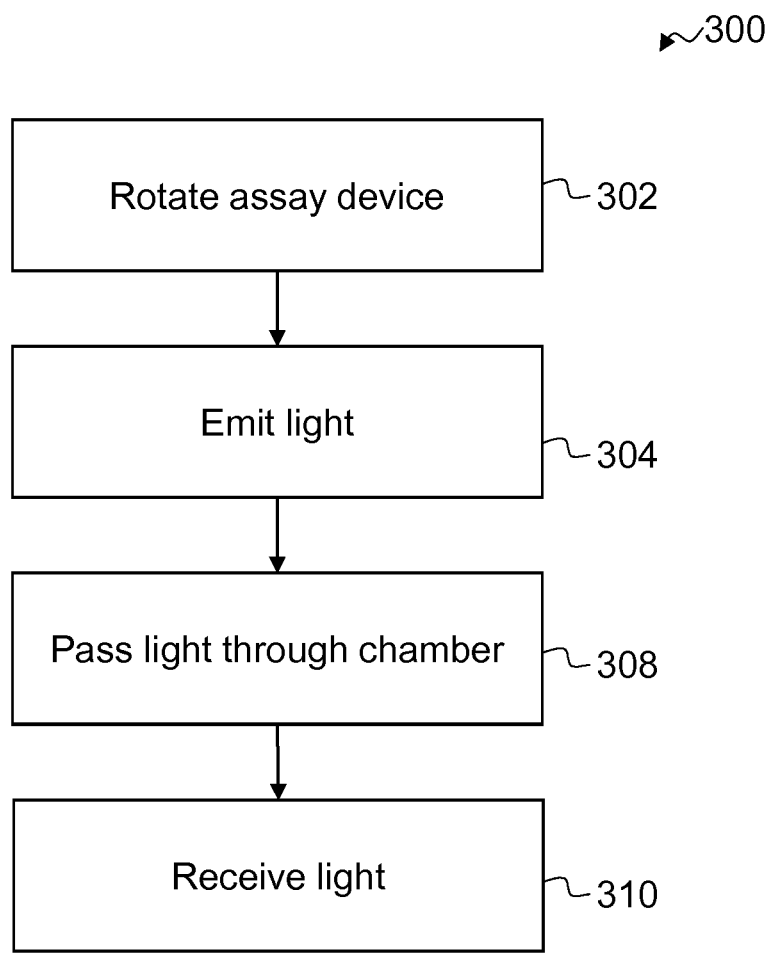
FIG. 3 illustrates a method of receiving light.

With reference to FIG. 3, a process 300 for detecting light is described. At step 302, the detection device 102 rotates the assay device 104 using the motor coupled to the spindle 120. The speed of rotation is greater than 0 Hertz and may be, for example, at least 0.1, 0.2, 0.3, 0.5, 1, 10 or 100 Hertz. At step 304, the light source 122 of the detection device emits light towards the rotating assay device.

At step 310, light that has passed through the chamber is received at the light receiver 124. In particular, steps 304 to 310 are carried out while the assay device is being rotated.

Figure 4:
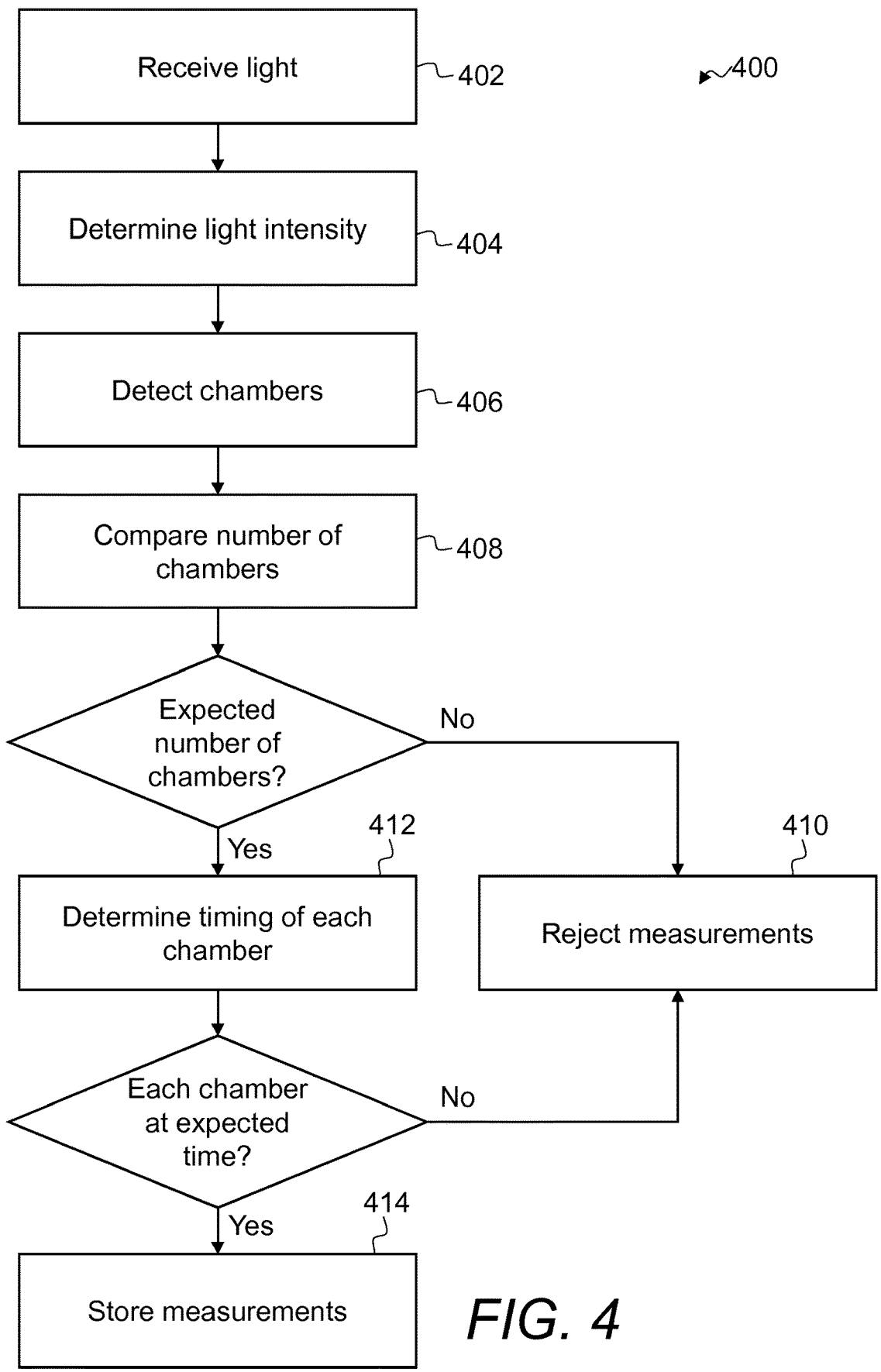
FIG. 4 illustrates a method of an effect of liquid sample on light.

With reference to FIG. 4, a process 400 for determining an effect on light due to the liquid in the chamber is described. At step 402, light is received at a light receiver as an assay device is rotated in a detection system, for example following the step 310 of process 300 described with reference to FIG. 3.

At step 404, the processor 202 determines the light intensity of the received light. For example, the light intensity may be based on the time taken for the light receiver to reach a predetermined voltage (referred to as the "discharge time"), where a shorter discharge time indicates a higher light intensity and a longer discharge time indicates a lower light intensity. If light reaching the light receiver is not sufficient to discharge the light receiver to the predetermined voltage within a predetermined time, for example, when the light source, light receiver and one of the chambers are not in a predetermined configuration, the measurement is considered out of time ("time-out"). A set of measurements for each complete rotation of the assay device (i.e. where the assay device has been rotated through 360 degrees) is received by the data processing device 106 and may comprise discharge time measurements corresponding to one or more chambers, with "time-out" measurements in between them.

Figure 5:
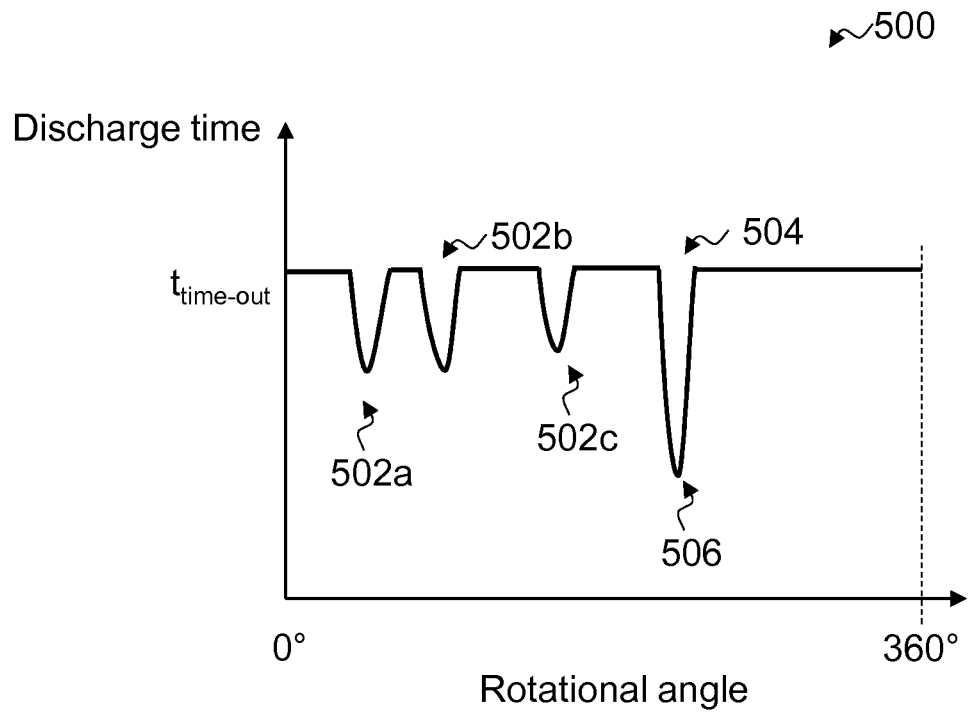
FIG. 5 illustrates a plot of light intensity variation against rotation angle.

With reference to FIG. 5, an example variation 500 of discharge time over one full rotation (i.e. 360 degrees) of an assay device is illustrated. The example assay device comprises three liquid-filled chambers and a reference device. The reference device may be an empty chamber or a solid portion of the assay device through which light from the light source travels through before reaching the light receiver. The reference device may be used to determine a maximum light intensity that can reach the light receiver.

The variation 500 comprises three regions 502a, 502b, 502c. In each region 502a, 502b, 502c the discharge time decreases from the "time-out" discharge time as the rotation angle increase. This corresponds to more light reaching the light receiver 124 as the respective chamber is rotated towards its respective predetermined configuration relative to the light source 122 and the light receiver 124, to a minimum discharge time for the corresponding chamber. In each region 502a, 502b, 502c the discharge time increases from the respective minimum discharge time as the rotation angle increases to the "time-out" discharge time as less light reaches the light receiver 124. This corresponds to the respective chamber being rotated away from its respective predetermined configuration relative to the light source 122 and the light receiver 124.

The variation 500 also comprises a region 504 corresponding to the reference device. In the region 504, as the rotation angle increases, the discharge time decreases from the "time-out" discharge time to a configuration corresponding to the maximum light intensity 506 that can reach the light receiver. Then, in the region 504, as the rotation angle increases the discharge time increases from the maximum light intensity configuration 506 to the "time-out" discharge time.

Returning to FIG. 4, at step 406, the processor 202 detects any chambers in a set of measurements for a complete rotation. The detection of chambers uses the light intensity determined at step 404. For example, the first measurement of discharge time lower than the "time-out" discharge time is determined by the processor as corresponding to the "start" of a chamber, and the measurement before a plurality of consecutive "time-out" discharge time measurements is determined by the processor as corresponding the "end" of the chamber. The light intensity measurements between the start and the end of a respective chamber are determined by the processor to relate to the same chamber.

At step 408, the processor 202 compares the number of chambers detected in set of measurements to determine whether an expected number of chambers are present in each set of measurements. The expected number of chambers may be based on a user input to the processor, or based on the most commonly occurring number (i.e. the mode) of chambers across all sets of measurements for the same assay device. If the number of chambers in a set of measurements does not match the expected number of chambers, at step 410, the respective set of measurements is rejected. If the number of chambers is the same as the expected number of chambers, the process 400 continues to step 412.

At step 412, the processor 202 determines whether each chamber is detected at substantially the same time in the rotation in each set of measurements. This may be done based on one measurement from a respective chamber, for example, the first measurement or the measurement corresponding to the highest light intensity within the measurements for the respective chamber. For example, a chamber may be characterised by its first measurement which occurs at 0.1 seconds since the start of a rotation in a first set of measurements for a first complete rotation, where the start of the rotation may be indicated relative to a reference device. The processor at step 412 determines whether the first measurement of the same chamber in a second set of measurements for a second complete rotation of the same assay device also occurs at around 0.1 seconds since the start of the rotation. If each chamber of the assay device does not appear at substantially the same time in each set of measurements, at step 410, all sets of measurements are rejected as this is indicative of the assay not being carried out at a constant rotational speed. If each chamber is present in each set of measurements at substantially the same time, the process 400 continues to step 414.

In some embodiments, steps 408 and 412 are carried out substantially in parallel rather than sequentially. It is to be understood that the checks at step 408 are 412 are optional. For example, in some embodiments, alternatively or additionally to the check at step 412, the processor 202 may determine whether the chamber is detected at substantially the same position in each rotation relative to the reference device. If the chamber is not at substantially the same position in each rotation relative to the reference device, all sets of measurements may be rejected.

At step 414, the set of measurements are stored in the memory 204, for example as time series data. The measurements for each chamber may be separated and stored separately for analysis to be carried out on the measurements of an individual chamber.

The stored sets of measurements can then be analysed, for example, to indicate the amount of light absorbed, scattered and/or reflected by the liquid in the chamber, or to indicate changes in the refractive index of the liquid.

Example analyses on the data stored at step 414 are now described. The exemplary analyses presented below are based on an array of pre-processed summary data. For each complete rotation of the assay device there are a plurality of measurements corresponding to each chamber. The plurality of measurements is processed to calculate a summary metric and indexed to a representative time point (time stamp). When the summary metric (sensor response) is plot against time, a sensorgram is generated for each chamber.

During the pre-processing phase, the metric(s) to be extracted/calculated from each set of measurements may be for example:
   the minimum/maximum or centroid value from each set of measurements corresponding to a given time stamp; and
   any parameter extracted from a fit to the set of measured data that could be correlated with the effect on light of the liquid sample and indexed to a time stamp.

These or other additional metrics (e.g. the minimum number of measurements on the descending and/or ascending flank, the number of convexities, the minimum signal width, the number of measurements per set or any other parameter correlated to the fitness of measured data to an expected curve) may also be used for quality control purposes. For example, to remove outlier measurements or reject the summary metric in case of unexpected signal behaviour (e.g. due to a sporadic hardware error). Moreover, the number of measurements per set may also be used as feedback to a control system that allows adjusting the rotational speed of the assay device or a light intensity threshold of the light receiver (e.g. LED voltage threshold) to ensure uniform sampling rates that account for the influence of the liquid sample on the detected light as a reaction in the liquid progress.

At this stage, the metrics extracted for each chamber may also be normalised relative to the metrics extracted for the reference device.

The sensorgram data for each chamber may be processed based on coherence criteria. For example:
- outliers may be removed using data continuity criteria; and
- incorrect chamber assignments (encoding errors) may be corrected based on the fit of the sensorgram data to an expected response (provided calibration data for each chamber or reference device).

The sensorgram data may be processed using cost functions that should be minimised (e.g. goodness of fit estimated by sum of least squares or a Chi-squared test).

Alternatively, the sensorgram data may be processed using similarity metrics that should be maximised (e.g. correlation coefficient).

A first example analysis, referred to as G parameter analysis, comprises averaging, for each chamber, the first and last set of light intensity measurements, constituting the initial ($M_i$) and final ($M_f$) measurement references. $M_i$ and $M_f$ correspond to reference metrics calculated as an average of the summary metrics obtained from a series of time points taken from the beginning ($M_i$) and from the end ($M_f$) of the sensorgram. From those references, the G parameter is determined as:

$$G = \frac{M_f - M_i}{M_i}$$

The G parameter provides insight into the normalised decrease in the measured light intensity), an indication on the evolution of a reaction in the chamber 108 that increasingly blocks incoming light from the light source 122.

Alternatively, the evolution of the reaction in the chamber 108 can also be analysed by fixing a normalised growth threshold and evaluating the time required for that threshold to be achieved. This analysis strategy is defined as G_In_Time and is defined as:

$$G(t) = \frac{M_f - M_i}{M_i}; G(T) = G_{thr};$$

where T is the time when the threshold, $G_{thr}$, is met.

A second example analysis is performed using the light intensity normalised to the first measurement. This is acquired from discharge times as:

$$I_j = \frac{DT_0}{DT_j}$$

Where $I_j$ and $DT_j$ are the intensity and discharge time at the data point j, respectively.

From the initial dataset, a fit is performed on the data of each chambers with a function that is appropriate to describe the reaction evolution. For example, an exponential decay fit:

$$f(t) = A \exp^{-B/t} + C$$

is attempted on the normalized intensity data, estimating the asymptote (parameter C) to which the reaction evolves, along with the parameters describing the evolution (A and B).

The parameters obtained in both the first and second analyses are also converted among them using previously defined calibration curves to perform self-consistency checks and use these as rejection criteria for the assay data, which prevents an invalid result calculation.

In any of the analysis, the obtained values are corrected based on previously determined calibration curves. Along the data post-processing several other consistency and rejection criteria are run, e.g. if no data is acquired near the start or end of the acquisition that enable the ($M_i$) and ($M_f$) calculations and other criteria based on the output parameters of both analysis. The calibrated output of both analysis is then used for the final value estimation.

The above description has been made in terms of specific embodiments for the purpose of illustration and not limitation. Many modifications and combinations of, and alternatives to, the features described above will be apparent to a person skilled in the art and are intended to fall within the scope of the invention, which is defined by the claims that follow. For example, while chambers have been described above with reference to drawings depicting chambers of a certain form factor, it will be appreciated that the disclosure is not so limited and that the described chambers may take any suitable shape or configuration, for example have varying depth, be significantly elongate to resemble a channel, for example a serpentine or meandering channel, be formed by a network of channels or cavities, contain pillars, comprise interconnected volumes, etc.

Embodiments have been described with reference to microfluidic devices, specifically centrifugal microfluidic devices used in assays, but it will be apparent that the concept of measuring light absorption described herein is not limited to any particular device or application. It will be appreciated that the disclosure extends to all such embodiments and is also not limited to any specific way of manufacturing the devices or any specific form factor.

The invention claimed is:

1. A method of determining an effect of a liquid sample on light, the method comprising:
    rotating an assay device comprising one or more chambers for containing the liquid sample;
    directing light from a light source to the rotating assay device such that the light passes through the one or more chambers as each of the one or more chambers is in a respective predetermined configuration relative to the light source and a light receiver, and wherein the light source and the light receiver are arranged on the same side of the rotating assay device;
    receiving, at the light receiver, light from the light source that has passed through the one or more chambers within the rotating assay device for at least one complete rotation of the assay device;
determining a set of light intensity measurements for each complete rotation of the assay device;
determining measurements of light intensity within each set of light intensity measurements that were obtained when the light passed through the one or more chambers;
determining the number of measurements that meet a light intensity condition in one of the sets of measurements;
changing the light intensity condition for sets of measurements for subsequent complete rotations based on the number of measurements that met the light intensity condition; and
determining, using the measurements of light intensity that were obtained when the light passed through the one or more chambers, the effect of the liquid sample on the light from the light source.

2. The method of claim 1, wherein each of the one or more chambers is associated with a first reflecting surface and a second reflecting surface, and directing light comprises, for each chamber:
reflecting light from the light source to the respective chamber using the respective first reflecting surface; and
reflecting light from the respective chamber to the light receiver using the respective second reflecting surface.

3. The method of claim 1, comprising, for each set of measurements:
determining the number of chambers in the respective set of measurements of light intensity;
comparing the number of chambers with an expected number of chambers; and
if the number of chambers in the respective set of measurements of light intensity is not the expected number of chambers, rejecting the respective set of measurements of light intensity.

4. The method of claim 3, comprising storing the sets of measurements that are not rejected.

5. The method of claim 1, comprising:
determining the position of a reference device; and
for each set of measurements:
determining whether each of the one or more chambers are in an expected position relative to the reference device in the respective set of measurements; and
if the one or more chambers are not in the expected position relative to the reference device in the respective set of measurements, rejecting the respective set of measurements.

6. The method of claim 5, comprising storing the sets of measurements of light intensity that are not rejected.

7. The method of claim 1, comprising:
determining the number of measurements of light intensity in one of the sets of measurements of light intensity; and
changing the speed of rotation of the assay device based on the determined number of measurements of light intensity.

8. One or more computer readable storage media comprising instructions which, when executed by a computer, cause the computer to carry out the steps of the method of claim 1.

9. A detection system comprising:
an assay device having one or more chambers for containing a liquid sample;
a drive arrangement engaging the assay device to rotate the assay device;
one or more light sources each arranged to emit light towards a corresponding one of the one or more chambers within the assay device;
a light receiver corresponding to each of the one or more light sources, each light receiver arranged to receive light from the corresponding one of the one or more chambers within the assay device; and
one or more processors programmed to:
cause the drive arrangement to rotate the assay device at least one complete rotation;
cause the one or more light sources to emit light towards the rotating assay device;
receive signals from each light receiver;
determine a set of light intensity measurements for each complete rotation of the assay device;
determine measurements of light intensity within each set of light intensity measurements that were obtained when the light passed through the one or more chambers;
determining the number of measurements that meet a light intensity condition in one of the sets of measurements;
changing the light intensity condition for sets of measurements for subsequent complete rotations based on the number of measurements that met the light intensity condition; and
determine, using the measurements of light intensity that were obtained when the light passed through the one or more chambers, the effect of the liquid sample on the light from the light source.

10. The system of claim 9, wherein, for each chamber, the assay device comprises a first surface arranged to reflect light from the light source to the chamber, and a second surface arranged to reflect light from the respective chamber to the light receiver.

11. The system of claim 9, wherein the one or more processors are programmed to, for each set of measurements:
determine the number of chambers in the respective set of measurements;
compare the number of chambers with an expected number of chambers; and
if the number of chambers in the respective set of measurements is not the expected number of chambers, reject the respective set of measurements.

12. The system of claim 11, comprising a memory, and wherein the one or more processors are programmed to store the sets of measurements that are not rejected in the memory.

13. The system of claim 9, wherein the one or more processors are programmed to:
determine the position of a reference device; and
for each set of measurements:
determine whether each of the one or more chambers are in an expected position relative to the reference device in the respective set of measurements; and
if the one or more chambers are not in the expected position relative to the reference device in the respective set of measurements, reject the respective set of measurements.

14. The system of claim 13, comprising a memory, and wherein the one or more processors are programmed to store the sets of measurements that are not rejected in the memory.

15. The system of claim 9, wherein the one or more processors are programmed to:
determine the number of measurements in one of the sets of measurements; and change the speed of rotation of the assay device based on the determined number of measurements.

\* \* \* \* \*